(12) United States Patent
Chun

(10) Patent No.: US 10,862,390 B2
(45) Date of Patent: Dec. 8, 2020

(54) STRUCTURE FOR VARIABLY CONTROLLING Y-CAPACITOR FOR NOISE ATTENUATION CONTROL

(71) Applicants: HYUNDAI MOTOR COMPANY, Seoul (KR); KIA MOTORS CORPORATION, Seoul (KR)

(72) Inventor: Ho-Tae Chun, Asan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/600,755

(22) Filed: Oct. 14, 2019

(65) Prior Publication Data

US 2020/0186025 A1 Jun. 11, 2020

(30) Foreign Application Priority Data

Dec. 11, 2018 (KR) .......................... 10-2018-0159459

(51) Int. Cl.
| | |
|---|---|
| *H02M 1/08* | (2006.01) |
| *H02M 1/12* | (2006.01) |
| *H02M 1/44* | (2007.01) |
| *B60L 53/22* | (2019.01) |

(52) U.S. Cl.
CPC ............... *H02M 1/44* (2013.01); *B60L 53/22* (2019.02); *H02M 1/08* (2013.01); *H02M 2001/123* (2013.01)

(58) Field of Classification Search
CPC ........... B60L 53/22; H02M 1/08; H02M 1/12; H02M 1/44; H02M 1/143; H02M 2001/123
See application file for complete search history.

(56) References Cited

U.S. PATENT DOCUMENTS

| | | | |
|---|---|---|---|
| 2010/0027305 A1* | 2/2010 | Oyobe .................... | B60L 50/61 363/131 |
| 2016/0129795 A1* | 5/2016 | Chizuwa .................. | H02J 7/02 320/109 |
| 2019/0165713 A1* | 5/2019 | Namuduri ............... | B60L 53/22 |

FOREIGN PATENT DOCUMENTS

KR 10-2014-0083715 A 6/2014

* cited by examiner

*Primary Examiner* — Levi Gannon
(74) *Attorney, Agent, or Firm* — Brinks Gilson & Lione

(57) ABSTRACT

A structure for controlling a Y-capacitor for reducing common mode noise of an electric power conversion system of an environmentally-friendly vehicle. The structure cooperates with an infotainment system for a vehicle and reduces common mode noise of an electric power conversion system. In particular, the structure includes: a switching element connected to a high-voltage power source coupled to the vehicle and to attenuate noise occurring at the time of PWM control; and an electric power conversion part which receives common mode noise occurring from the power source and controls ON/OFF of the switching elements in order to reduce the received common mode noise.

5 Claims, 5 Drawing Sheets

Fig.1 "PRIOR ART"

STRUCTURE FOR VARIABLY CONTROLLING Y-CAPACITOR FOR NOISE ATTENUATION CONTROL

CROSS-REFERENCE TO RELATED APPLICATION

This application claims priority to and the benefit of Korean Patent Application No. 10-2018-0159459, filed on Dec. 11, 2018, the entire contents of which are incorporated herein by reference.

FIELD

The present disclosure relates to a structure for variably controlling a capacitor for noise attenuation control.

BACKGROUND

The statements in this section merely provide background information related to the present disclosure and may not constitute prior art.

An environmentally-friendly vehicle (xEV) has an electric power conversion system that converts high-voltage electric power into desired electric power. Typically, the pulse with modulation (PWM) control is used to most efficiently convert AC-DC, DC-DC, and DC-AC power. Electromagnetic wave noise is generated as a side effect when performing PWM control, and common mode noise, which is a type of generated electromagnetic wave noise, directly and indirectly makes a great effect on an electromagnetic compatibility (EMC) performance of the vehicle.

In particular, the common mode noise directly affects a performance of an infotainment system in the vehicle. A multimedia and radio receiving performance deteriorates due to the noise, which consequently causes deterioration in overall marketability of the vehicle. A Y-capacitor is considered as a solution for effectively reducing the common mode noise, and almost all high-voltage electric power conversion devices adopt the Y-capacitor.

In this regard, as the related art, Korean Patent Application Laid-Open No. 10-2014-0073715 (Capacitor Module of Inverter for Vehicle) discloses a capacitor module of an inverter for a vehicle, and the capacitor module of the inverter for a vehicle includes i) a module housing, ii) a DC capacitor which is disposed in the module housing and inhibits variations of voltages and electric currents at a DC input terminal of the inverter, and iii) a CM filter which is disposed in the module housing together with the DC capacitor and removes common mode noise.

However, we have discovered that in the related art, a capacitor is adopted in a fixed state in order to remove PWM common mode noise occurring from a high-voltage electric power conversion device, and as a result, there is a limitation in that a noise attenuation band is restricted.

SUMMARY

The present disclosure provides a structure for variably controlling a Y-capacitor, which is capable of overcoming a limitation caused by a restriction of a noise attenuation band, performing variable control, and improving an electromagnetic wave performance depending on an operating mode of an infotainment system.

An exemplary form of the present disclosure provides a structure for variably controlling a Y-capacitor for noise attenuation control, which cooperates with an infotainment system for a vehicle and reduces common mode noise of an electric power conversion system. The structure includes: one or more switching elements connected to a high-voltage power source coupled to the vehicle and configured to receive electric power from the high-voltage power source, wherein the switching elements are configured to attenuate noise occurring at the time of PWM control; and an electric power conversion part which receives the common mode noise occurring from the high-voltage power source controls ON/OFF of the switching elements and reduces the received common mode noise.

The switching elements may be connected to a series Y-capacitor or a parallel Y-capacitor.

The electric power conversion part may further include a switching element controller which changes ON/OFF of the switching elements.

The controller may set a control mode for the switching elements, and the control mode is set in advance in a frequency band so as to attenuate the common mode noise depending on a band of the common mode noise.

The electric power conversion part may be arranged between the switching element and the infotainment system, and may control the switching elements based on an operating mode of the infotainment system.

According to the present disclosure configured as described above, it is possible to vary (control) an attenuation band of a Y-capacitor filter and diversify the attenuation band of the filter depending on the operating mode of the infotainment system.

According to the present disclosure, it is possible to improve an electromagnetic wave performance (weak electric field receiving performance) in all of the operating modes of the infotainment system, and as a result, it is possible to provide excellent marketability (quality of reception of broadcasts/media) and improve customer satisfaction in comparison with competitors.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
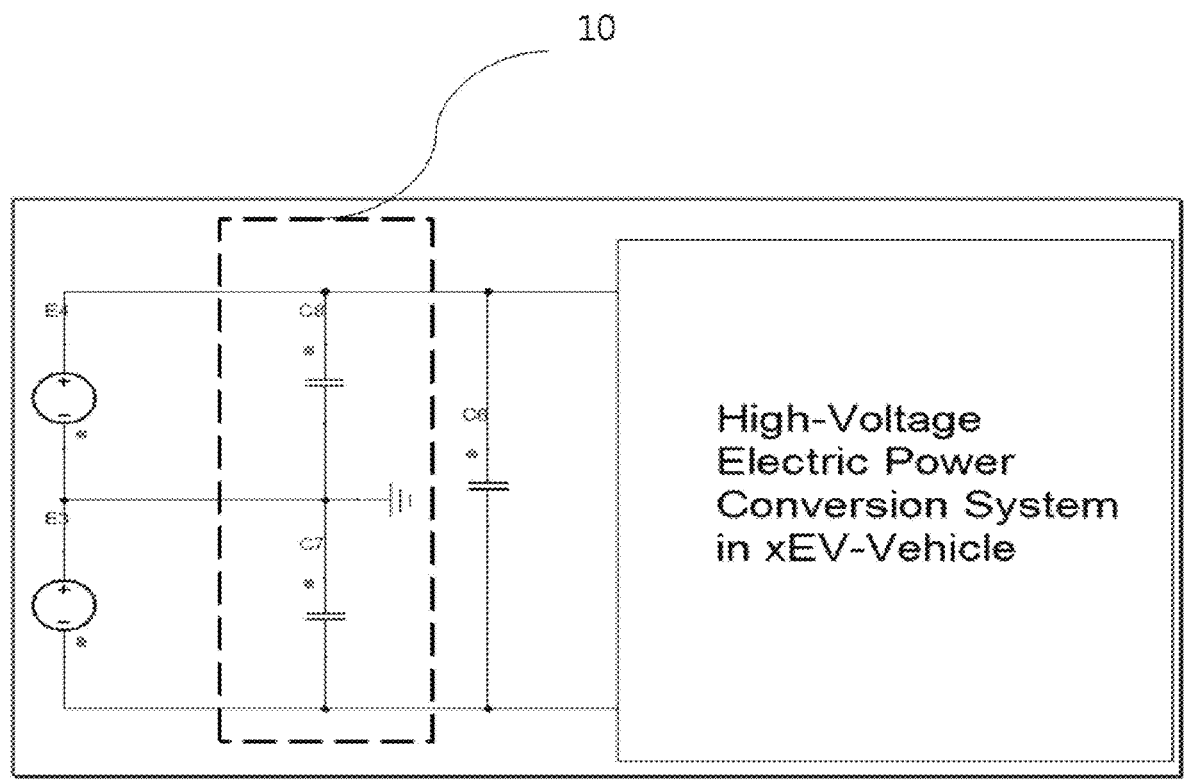
FIG. 1 is a view illustrating a structure of a Y-capacitor filter in the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An object and an effect of the present disclosure may be naturally understood or may become clearer from the following description, and the object and the effect of the present disclosure are not restricted only by the following description. In addition, in the description of the present disclosure, the specific descriptions of publicly known technologies related with the present disclosure will be omitted when it is determined that the specific descriptions may unnecessarily obscure the subject matter of the present disclosure.

FIG. 1 is a view illustrating a structure of a Y-capacitor filter 10 in the related art. Referring to FIG. 1, the Y-capacitor filter 10 in the related art is adopted in a fixed state in order to remove PWM common mode noise occurring from a high-voltage electric power conversion device, and as a result, there is a limitation in that a noise attenuation band is restricted.

Multimedia and radio receiving bands of an infotainment system for a vehicle are gradually increased to provide a driver with convenience, and as a result, it is desired to also increase an attenuation band of the Y-capacitor filter 10. However, it is difficult for a capacity of the single Y-capacitor filter 10 in the related art to meet the necessity.

Figure 2:
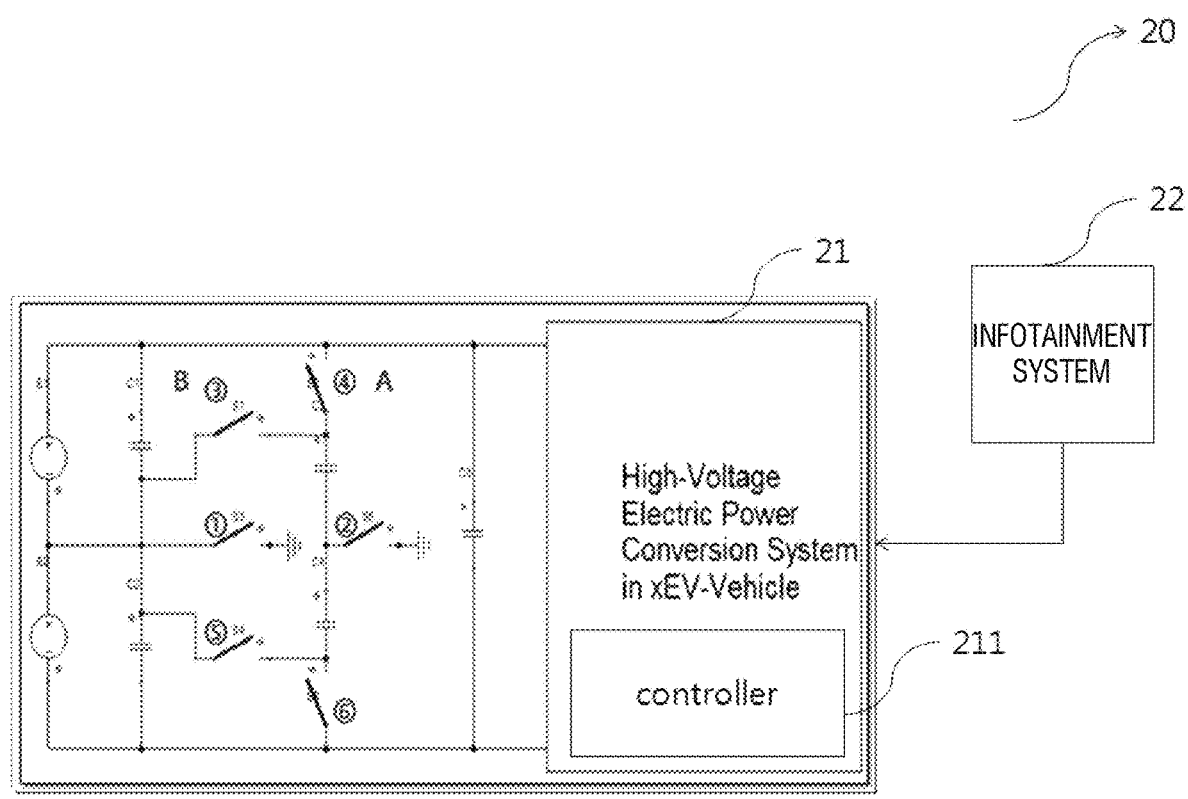
FIG. 2 is a view illustrating a structure for variably controlling a Y-capacitor applied to an active high voltage.

FIG. 2 is a view illustrating a structure 20 for variably controlling a Y-capacitor applied to an active high voltage in one form of the present disclosure. Referring to FIG. 2, the structure 20 may include: switching elements ① to ⑥ an electric power conversion part 21, and a switching element controller 211 for controlling the switching elements. In one form, the switching element controller 211 may be separately provided in the electric power conversion part 21. The constituent elements of the present disclosure may include the switching elements (relays, FETs, etc.) for changing the Y-capacitor filter, and the switching element controller (internal configuration of the electric power conversion part 21), and an interface capable of cooperative control may be configured between an infotainment system 22 and the electric power conversion part 21. At the time of the cooperative control, it is possible to control the switching elements by receiving information about the current operating mode (AM, FM, DMB etc.).

The switching elements may be connected, in the form of a series or parallel Y-capacitor, to one or more high-voltage power sources coupled to the vehicle so as to receive electric power from the power source and attenuate noise occurring at the time of PWM control. In addition, one or more switching elements may be connected in series or in parallel.

One or more series and parallel capacitors in the form of the Y-capacitor may be connected to the switching elements, and the switching element controller 211 for controlling the switching elements may control the switching elements depending on a control mode. The control mode for setting ON/OFF of the switching elements may be set in advance in a frequency band so as to attenuate common mode noise depending on the band of the common mode noise.

For example, an attenuation band may be managed as an A' band when the noise is in an A band, and the attenuation band may be managed as a B' band when the noise is in a B band. The bands are not the limited values, but may be values defined in the electric power conversion part 21.

Referring to back to FIG. 2, FIG. 2 is a conceptual view of the structure for variably controlling a Y-capacitor. The structure may operate to select a capacity of the high-voltage Y-capacitor which is most suitable for the current operating mode (AM, FM, DMB, etc.) of the infotainment system 22 by means of the cooperative control (CAN, LIN, etc.) between the infotainment system 22 such as an antenna, a multimedia device, and a radio and the high-voltage electric power conversion part 21 (inverter/converter).

The capacity of the high-voltage Y-capacitor may be selected by controlling the switching elements (relays, FETs, etc.), and the capacity may be changed to several cases depending on the number of Y-capacitor filters, positions of the switching elements, and a control manner.

In a case in which the Y-capacitor filters A and B and the switching elements ① to ⑥ are variably configured according to the exemplary form of the present disclosure, a total of four combinations (Y-capacitor A, Y-capacitor B, Y-capacitors A and B in series, and Y-capacitors A and B in parallel) of capacity values of the Y-capacitor may be selected. Each of the four combinations of the capacities of the Y-capacitor may be designed as an optimum value for each of the operating modes of the infotainment system 22, and the best EMC performance may be achieved for each of the operating modes.

It is possible to actively implement the structure for variably controlling the Y-capacitor by using the two types of Y-capacitors A and B and utilizing the six switching elements ① to ⑥.

TABLE 1

| | | |
|---|---|---|
| 1 | ②, ④, ⑥ Switch ON/①, ③, ⑤ Switch OFF | Y-capacitor A |
| 2 | ① Switch ON/②, ③, ④, ⑤, ⑥ Switch OFF | Y-capacitor B |
| 3 | ②, ③, ⑤ Switch ON/①, ④, ⑥ Switch OFF | Y-capacitors A and B in series |
| 4 | ①, ②, ④, ⑥ Switch ON/③, ⑤ Switch OFF | Y-capacitors A and B in parallel |
| 5 | ②, ③, ④, ⑤, ⑥ Switch ON/① Switch OFF | Combination of 1 and 3 |

The types of Y-capacitors and the number of switching elements may be increased when the band of noise in the infotainment system 22, which needs to be attenuated, is increased. An increase in capacity of the Y-capacitor (parallel connection structure) may implement additional attenuation in a relatively low frequency band, and a decrease in capacity of the Y-capacitor (series connection structure) may implement additional attenuation in a relatively high frequency band.

The electric power conversion part 21 may control ON/OFF of the switching elements in order to receive common mode noise occurring from the power source and reduce the received common mode noise. In the case in which the electric power conversion part 21 includes the switching element controller 211, the switching element controller 211 may change ON/OFF of the switching elements. The electric power conversion part 21 may control, between the switching elements and the infotainment system 22, the switching elements depending on the operating mode of the infotainment system 22.

Figure 3:
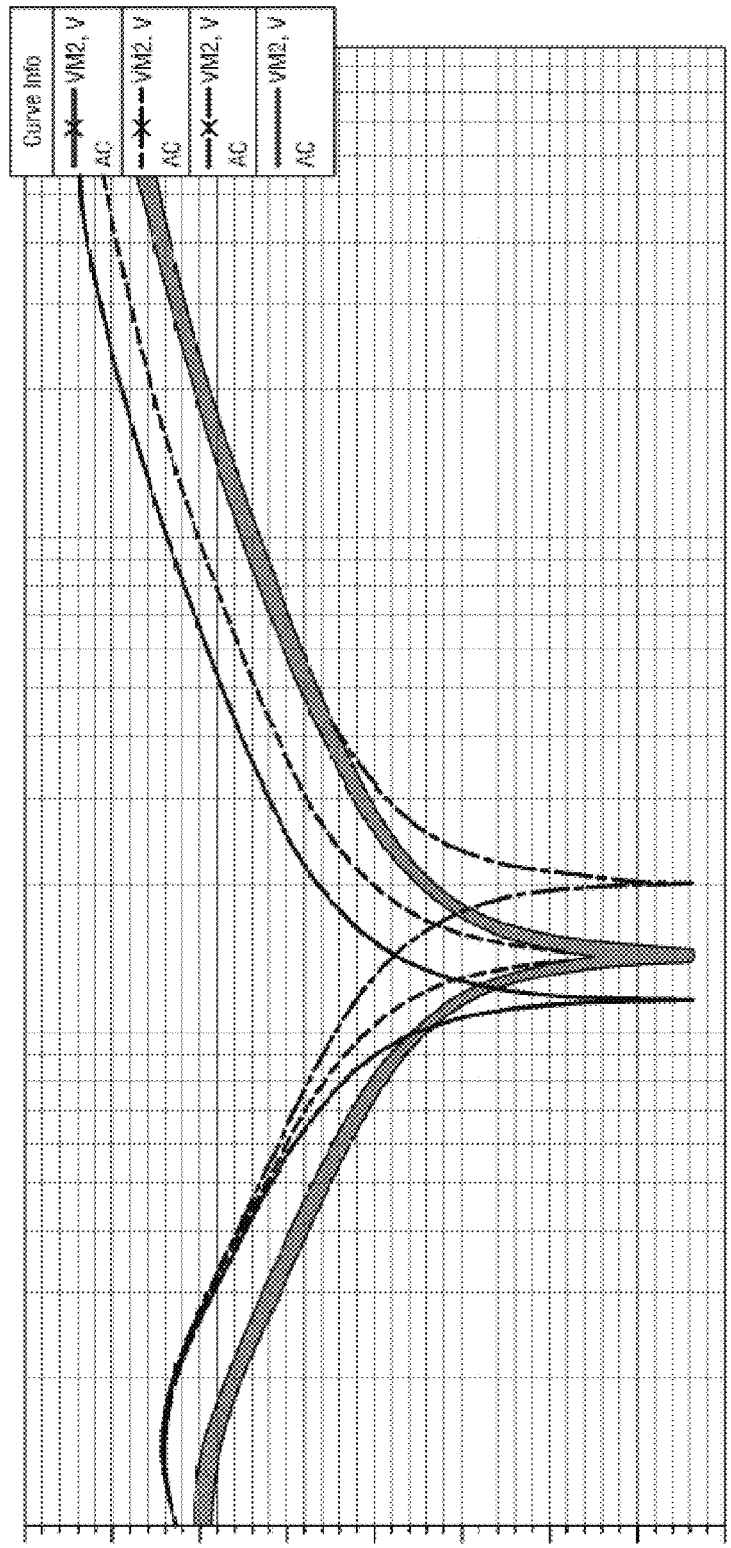
FIG. 3 is a view illustrating a state in which various attenuation bands are implemented by variable control.

FIG. 3 is a view illustrating a state in which various attenuation bands are implemented by variable control according to the exemplary form of the present disclosure. Referring to FIG. 3, it is possible to implement various attenuation bands depending on the control mode of the switching elements in comparison with the single attenuation band of the fixed Y-capacitor in the related art.

It is possible to convert the attenuation band into the attenuation band of the filter which is optimized in respect to the current operating mode by receiving information about the operating mode of the infotainment system 22 and controlling the switching elements. The Y-capacitor and the switching element may be additionally applied to additionally implement the attenuation band of the filter in a case in which the operating mode of the infotainment system 22 is increased or the band of noise, which needs to be attenuated, is increased.

Figure 4:
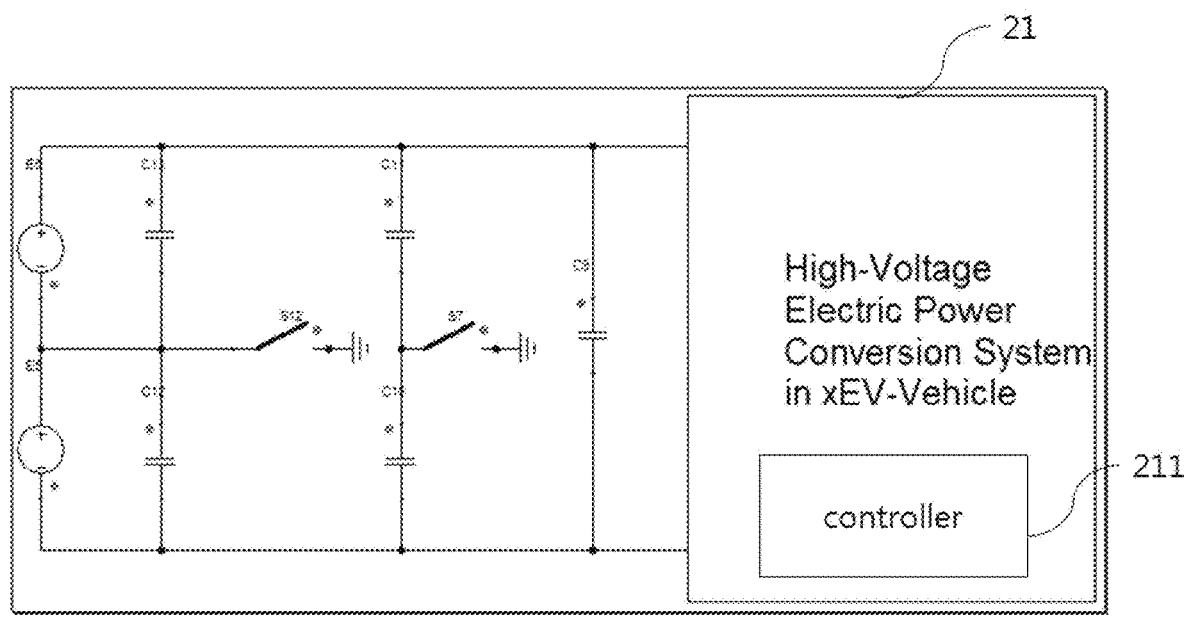
FIG. 4 is a view illustrating the structure for variably controlling a Y-capacitor which has a parallel structure.
Figure 5:
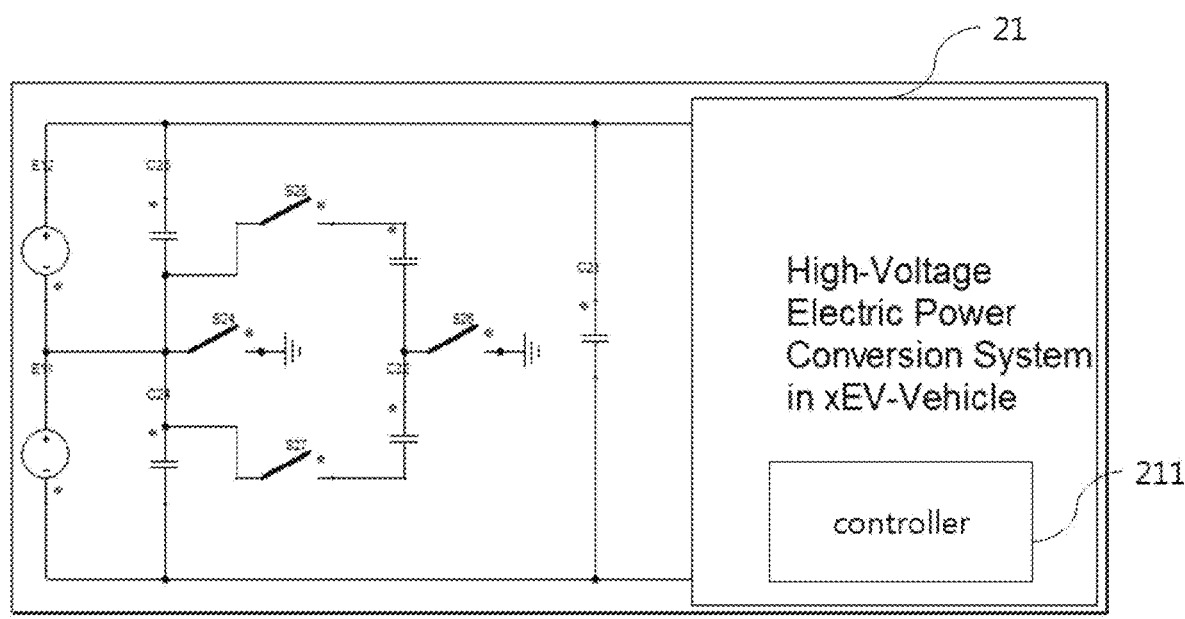
FIG. 5 is a view illustrating the structure for variably controlling a Y-capacitor which has a series structure.

FIG. 4 is a view illustrating the structure for variably controlling a Y-capacitor which has a parallel structure according to the exemplary form of the present disclosure, and FIG. 5 is a view illustrating the structure for variably controlling a Y-capacitor which has a series structure according to the exemplary form of the present disclosure. FIGS. 4 and 5 illustrate examples of various manners of the switching elements, and the structure is not limited to the examples. Since the configurations related to FIGS. 4 and 5 are identical to the aforementioned configurations related to FIG. 2, descriptions thereof with reference to FIGS. 4 and 5 will be omitted.

While the present disclosure has been described in detail above with reference to the representative exemplary form, those skilled in the art to which the present disclosure pertains will understand that the exemplary form may be variously modified without departing from the scope of the present disclosure. Accordingly, the scope of the present disclosure should not be limited to the described exemplary form.

What is claimed is:

1. A structure for variably controlling a Y-capacitor for noise attenuation control, which cooperates with an infotainment system for a vehicle and reduces common mode noise of an electric power conversion system, the structure comprising:

at least one switching element connected to a high-voltage power source coupled to the vehicle and configured to receive electric power from the high-voltage power source, the at least one switching element configured to attenuate noise occurring at a time of pulse width modulation (PWM) control; and an electric power conversion part configured to:
  receive the common mode noise occurring from the high-voltage power source,
  control ON/OFF of the at least one switching element, and
  reduce the received common mode noise.

2. The structure of claim 1, wherein the at least one switching element is connected to a series Y-capacitor or a parallel Y-capacitor.

3. The structure of claim 1, wherein the electric power conversion part further includes a switching controller configured to change ON/OFF of the at least one switching element.

4. The structure of claim 3, wherein the controller is configured to set a control mode for the at least one switching element, and
  wherein the control mode is set in advance in a frequency band so as to attenuate the common mode noise depending on a band of the common mode noise.

5. The structure of claim 1, wherein the electric power conversion part is arranged between the at least one switching element and the infotainment system, and configured to control the at least one switching element based on an operating mode of the infotainment system.

* * * * *